United States Patent [19]
Herbert

[11] 3,722,919
[45] Mar. 27, 1973

[54] ANTI-JACKKNIFE DEVICE

[76] Inventor: Francis A. Herbert, P.O. Box 81, Schriever, La. 70395

[22] Filed: Dec. 7, 1971

[21] Appl. No.: 205,519

[52] U.S. Cl. ............................ 280/432, 280/446 B
[51] Int. Cl. ............................................ B60d 7/00
[58] Field of Search ...................... 280/432, 446 B

[56] References Cited

UNITED STATES PATENTS

| | | | |
|---|---|---|---|
| 2,188,727 | 1/1940 | Soulis | 280/432 |
| 2,691,533 | 10/1954 | Koontz | 280/432 X |
| 2,918,309 | 12/1959 | Cellucci | 280/432 |
| 3,659,874 | 5/1972 | Rendessy | 280/432 X |

FOREIGN PATENTS OR APPLICATIONS 836,599    4/1952    Germany ............................ 280/432

*Primary Examiner*—Leo Friaglia
*Attorney*—Wilkinson, Mawhinney & Theibault

[57] ABSTRACT

The present invention is directed to a braking device separate from the wheel brakes of the vehicle which may be mounted either on the tractor or the trailer and which is subjected to the actuating fluid when the vehicle wheel brakes are applied and which locks with a cable drum and cable when the free end of the cable is connected to the unit of the tractor - trailer that a brake device is not connected to which will arrest the horizontal swing of the trailer relative to the tractor before attaining the point of no return at which jackknife results.

8 Claims, 8 Drawing Figures

Patented March 27, 1973  3,722,919

INVENTOR
FRANCIS A. HEBERT

BY Wilkinson, Mawhinney & Theibault
ATTORNEYS

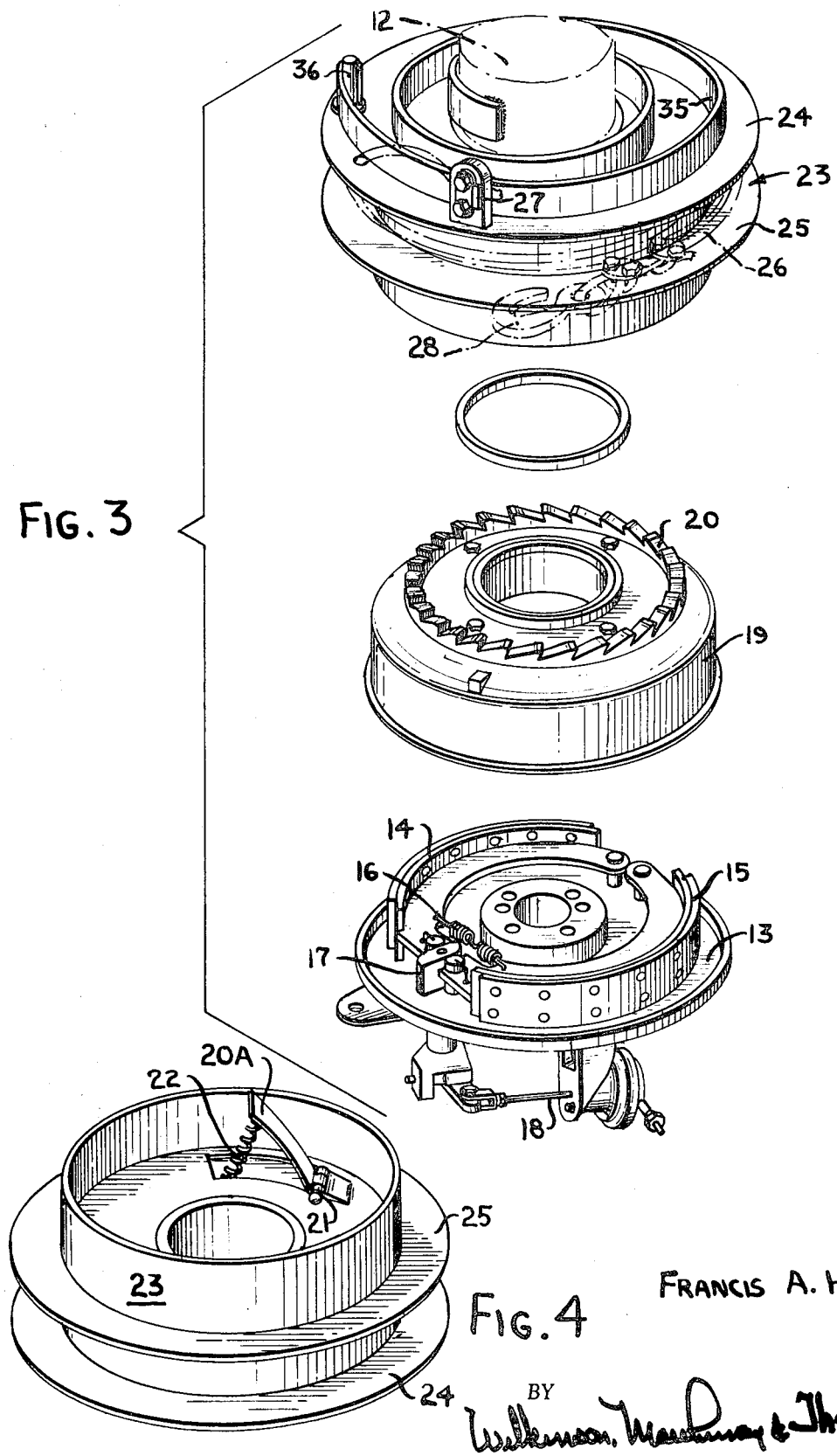

Patented March 27, 1973 3,722,919

INVENTOR
FRANCIS A. HEBERT

BY
Wilkinson Mawhinney & Theibault
ATTORNEYS

ANTI-JACKKNIFE DEVICE

An object of the present invention is to provide a simple uncomplicated mechanism which may be quickly and economically applied to a tractor - trailer combination without necessitating modification to the fifth wheel assembly or the vehicle braking system.

A further object of the present invention is an anti-jackknife device which employs conventional parts such as a brake drum, stator with conventional shoes and a cable drum assembly which has an overrunning engagement with the brake drum in one direction and a lock up in the other direction and which when a jackknife condition begins as when the tractor operator subjects it to a panic stop and one set of wheels on either tractor or trailer lock up will keep the articulated vehicle aligned with the taut cable between the tractor and trailer at a point rearwardly of the fifth wheel.

A still further object of the present invention is the provision of an anti-jackknife device which is rugged and simple in construction which does not require constant adjustment and which is virtually weatherproof.

THE PRIOR ART

Typical approaches to the anti-jackknife problem are to be found in U. S. Pat. Nos. 2,213,221; 2,804,314 and 3,231,295; however, each is directed to some form of braking device which has been applied to the fifth wheel of the tractor - trailer rig. The best art known to applicant is shown in U. S. Pat. No. 3,592,448 which employs a ratchet device under the control of solenoid actuated pawls to maintain tractor - trailer alignment; however, this device works in the immediate kingpin area of the fifth wheel and I have found that in practice the anti-jackknifing problem can best be delt with by applying the restraint or stopping force from a point removed from the kingpin and fifth wheel. I am aware of only one prior patent which attempts to control anti-jackknifing by restraining the trailer with the tractor by grasping and maintaining a rigid connection and that is U. S. Pat. No. 2,461,212; however, this device employs a complex hydraulic system and would require substantial modification to the tractor unit which my device because of its simplicity would not. Installation and maintainence of my device together with its low initial cost would appear to amount to a patentable step over the above art particularly since none of the above devices accomplish their end result employing the combination of elements which cooperate in the manner set forth in my claims.

With the foregoing and other objects in view, the invention will be more fully described hereinafter, and will be more particularly pointed out in the claims appended hereto.

In the drawings, wherein like symbols refer to like or corresponding parts throughout the several views:

FIG. 3 is an exploded perspective view of the unit of FIG. 2.

FIG. 4 is an inverted perspective view of the cable drum assembly showing its spring operated pawl.

Figure 1:
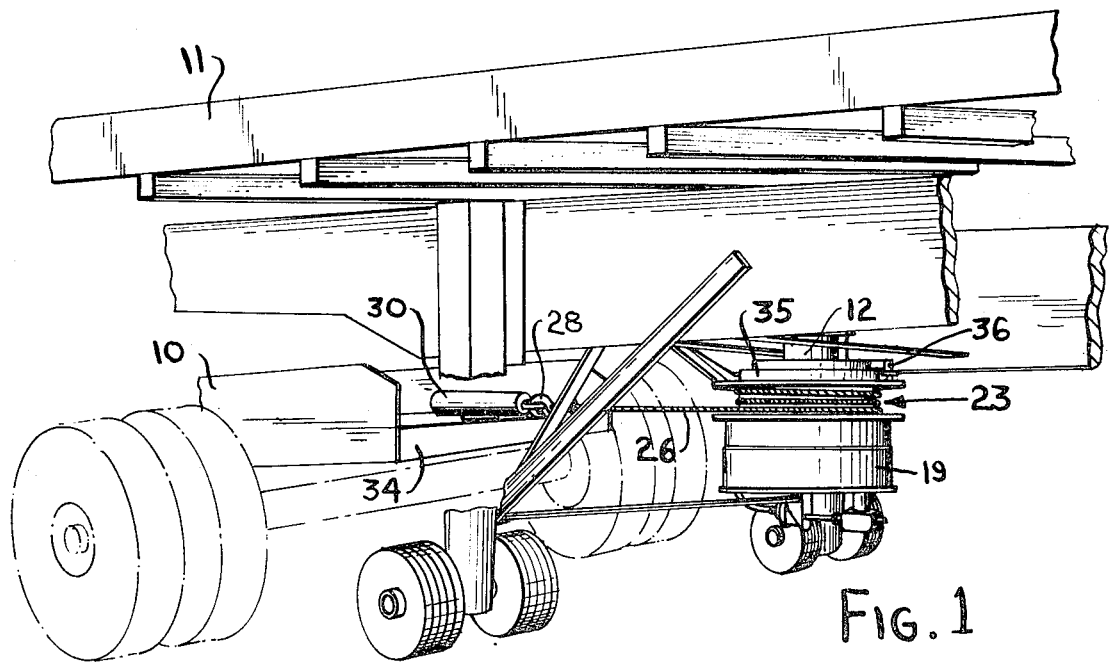
FIG. 1 is an underside perspective view of the device of the present invention shown applied to a tractor - trailer rig.

A tractor 10 and trailer 11 of a conventional tractor - trailer rig are jointed together by the conventional fifth wheel and kingpin assembly (not shown).

Mounted on the underside of the trailer 11, rearwardly of the fifth wheel is an axle 12, to which is secured at its base, the brake assembly bottom plate or stator 13 which carries the conventional brake shoes 14, 15, spring loaded to off position by spring load 16 and which shoes are moved to braking position by actuator cam 17 under control of a pneumatic cylinder and ram device 18.

Surrounding the brake shoes and riding upon the plate 13 is a conventional brake drum 19 having an annular ring assembly of ratchet teeth 20 secured to its top. The ratchet teeth slope in one direction only. Cooperating with the teeth 20 is a pawl 20A pivoted at 21 and spring loaded at 22 and carried by the underside of a cable drum assembly 23, best seen in FIG. 4. The upper portion of the cable drum assembly 23 has a pair of flanges 24, 25 between which is stored the alignment cable 26, one end of which is secured to lug 27 on top of the top flange 24.

Figure 2:
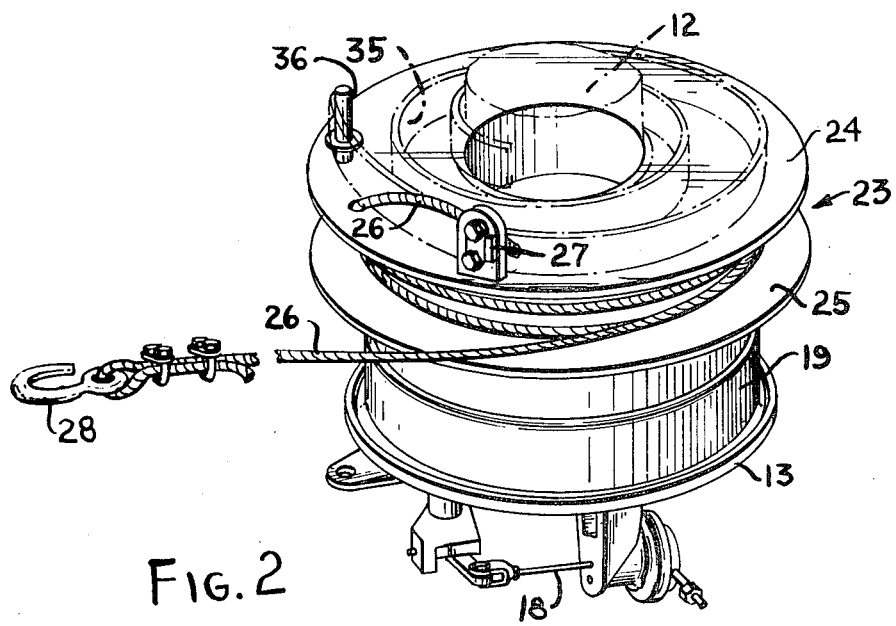
FIG. 2 is a perspective view of the unit of the anti-jackknife device which is applied to the underside of the trailer at a point rearwardly of the fifth wheel and kingpin.
Figure 6:
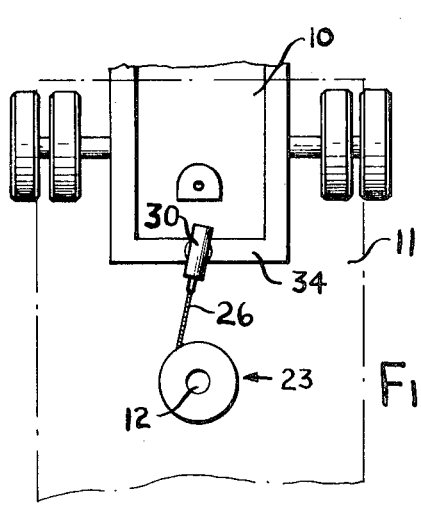
FIGS. 6 and 7 are diagrammatic views of a tractor - trailer rig on which the device of the present invention is installed making a turn from a straightaway.
Figure 7:
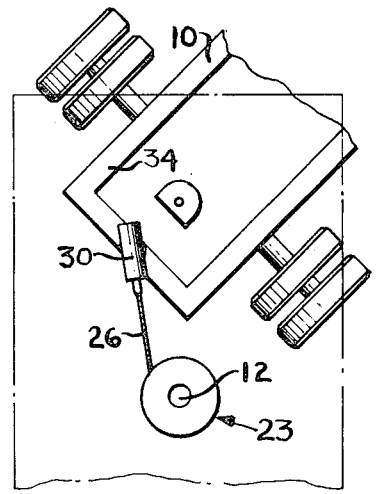
Figure 8:
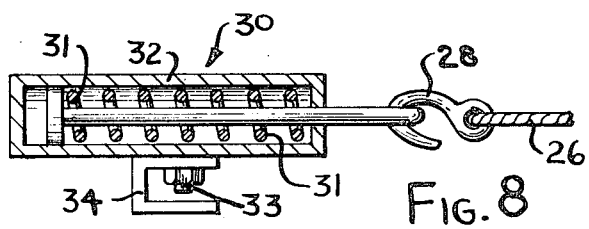
FIG. 8 is a longitudinal section through the spring loaded tractor hitch.
Figure 5:
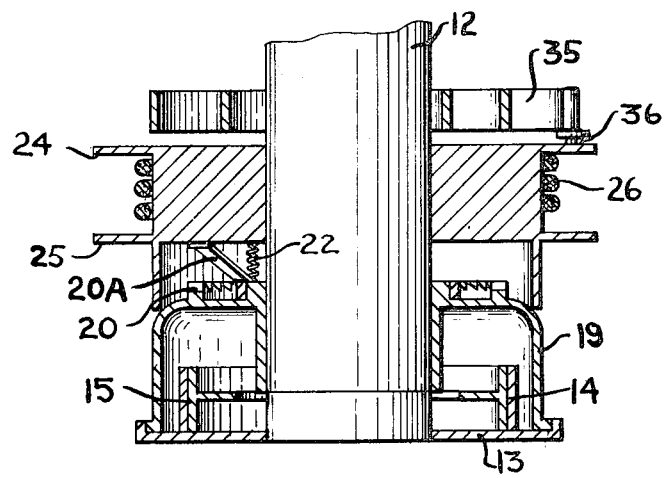
FIG. 5 is a vertical section through the assembled units of FIGS. 2 and 3.

As best seen in FIG. 2, the free end of the alignment cable 26 has a pelican hook 28 for attachment through an eye 29 of a spring loaded hitch 30 which has a compression spring 31 within the cylinderical housing 32 which has an attaching bolt 33 which passes through the rear transverse frame member 34 of the tractor 10.

The cable 26 is maintained taut by the action of a volute or clock spring 35, one end of which is secured to the axle 12 and the other end of which has a sleeve connection which passes over the upstanding projection 36 carried on the top flange 24 of the cable drum assembly.

The clock type spring 35 which controls the cable drum is provided with approximately a 40 pound preloaded pull while the spring on the tractor hitch 30 is a compression spring of about ten inches in length which requires at least 2500 pounds to place it in full compression.

IN OPERATION

The tractor 10 and trailer 11 are coupled in the conventional way and with the hitch 30 secured to the rear of the tractor and the assembly of FIG. 2 installed on the trailer rearwardly of the fifth wheel as shown in FIG. 1 the pelican hook 28 is passed through the eye of the spring loaded hitch 30 and the pneumatic operator 18 is connected to the air brake system of the vehicle so that as the brakes are applied to the wheels the two brake shoes 14 and 15 are applied against the inside of the brake drum 19. The pawl 20A locks with the teeth 20 on the brake drum 19 to restrain the cable drum assembly to keep the alignment cable 26 from paying out. Application of the brakes restrains the alignment cable from paying out but will permit the cable drum to rotate in a reverse direction to keep the cable taut under the control of the clock spring 35.

The strength of volute spring 35 is adequate to cause cable drum 23 to keep the cable 26 taut.

When going around a curve or turning if the brakes are slightly applied as the tractor and its connected trailer are straightened out the volute spring takes over causing the cable drum to wind in cable and maintain it taut so that should the brakes be suddenly applied the cable would instantly become taut and arrest any attempt of the trailer to misalign itself with the tractor to either left or the right thereof. The pivoted pawl 20A and the ratchet teeth 20 are the only connection between the cable drum assembly 23 and the brake drum 19 and then only in one direction. With the brakes on the cable 26 cannot pay out but the cable can be wound in by the volute spring 35 since upon any slack occurring as when straightening out after a turn such slack is taken up by the spring 35 so that should the brakes again be hit quickly the cable remains taut and the unit is locked up through the pawl 20A, teeth 20 and brake drum 19 to resist jackknifing.

What is claimed is:

1. For use with a tractor trailer rig an anti-jackknife device comprising an axle mounted on one of the elements of said rig
   a. a brake stator secured to the free end of said axle and having braking elements thereon,
   b. a complemental braking means carried for free rotation on said axle and positioned to be engaged by said braking elements,
   c. a cable drum assembly rotatable mounted on said axle,
   d. ratchet and pawl means one element of which is carried by said complemental braking means and the other element of which is carried by said cable drum assembly for locking said cable drum assembly with said complemental braking means upon rotation in one direction and permitting overrunning rotation between said cable drum assembly and said complemental braking means in the other direction,
   e. cable means one end of which is secured to said cable drum assembly,
   f. pivotally mounted yieldable means mounted on the other element of said rig,
   g. means for connecting the free end of said cable to said pivotally mounted yieldable means, and
   h. spring means one end of which is secured to the element of said rig upon which the axle is mounted and the other end of which is secured to said cable drum assembly to maintain the cable between the two elements of the rig taut.

2. An anti-jackknife device as claimed in claim 1 wherein said axle upon which the braking means and cable drum assembly are mounted is mounted with its axis vertical.

3. An anti-jackknife device as claimed in claim 1 wherein said axle is carried by the trailer rearwardly of its fifth wheel connection and depends vertically from the trailer.

4. An anti-jackknife device as claimed in claim 1 wherein the braking elements on said brake stator are adapted to be connected to the tractor braking fluid system.

5. An anti-jackknife device as claimed in claim 1 wherein the braking elements on said stator are brake shoes which engage the inside of the complemental braking means which is a brake drum.

6. An anti-jackknife device as claimed in claim 1 wherein said ratchet and pawl means comprises a sloped wall toothed ring secured to the complemental braking means for rotation therewith and the pawl means is a spring loaded pivotally mounted pawl on the cable drum assembly.

7. An anti-jackknife device as claimed in claim 1 wherein said pivotally mounted yieldable means is mounted on the rear of the tractor unit for pivoting movement in a horizontal plane.

8. An anti-jackknife device as claimed in claim 1 wherein said spring means is a flat volute spring one end of which is secured to the axle and the other end of which is secured to said cable drum assembly.

* * * * *